US006551105B2

(12) United States Patent
Desplace

(10) Patent No.: US 6,551,105 B2
(45) Date of Patent: Apr. 22, 2003

(54) METHOD OF ENHANCING OR MAINTAINING A RELATIONSHIP

(76) Inventor: Brenda Adele Desplace, Unit 2, Mawson Place, Lockyer Court, Forest Lake, Queensland, 4177 (AU)

( * ) Notice: Subject to any disclaimer, the term of this patent is extended or adjusted under 35 U.S.C. 154(b) by 0 days.

(21) Appl. No.: 09/813,395

(22) Filed: Mar. 21, 2001

(65) Prior Publication Data

US 2001/0024036 A1 Sep. 27, 2001

(30) Foreign Application Priority Data

Mar. 22, 2000 (AU) ............................................ PQ6393

(51) Int. Cl.[7] ............................................ G09B 19/00

(52) U.S. Cl. ........................................ 434/237; 434/322

(58) Field of Search ................................ 434/236, 237, 434/322, 128, 431, 433

(56) References Cited

U.S. PATENT DOCUMENTS

| | | | | |
|---|---|---|---|---|
| 1,792,652 A | * | 11/1931 | Morton | 40/312 |
| 4,738,392 A | * | 4/1988 | Kovacs | 232/34 |
| 5,213,509 A | * | 5/1993 | Gunn | 434/236 |

* cited by examiner

*Primary Examiner*—Derris H. Banks
*Assistant Examiner*—Faye Francis
(74) *Attorney, Agent, or Firm*—Abelman, Frayne & Schwab

(57) ABSTRACT

A method of enhancing or maintaining a relationship between two persons, including:

providing a container;

placing said container in a predetermined location in the dwelling of the persons in the relationship to be enhanced;

providing a means of communication between the persons, said means of communication being storable in said container;

providing a set of instructions for use with said means of communication and said container, said set including instructions that each of the persons in the relationship is to create messages to the other person and place them in said container at one or more first predetermined times, and that any messages in said container are to be reviewed by both persons together at one or more second predetermined times, said one or more first and second predetermined times being the dates of important events involving both persons.

6 Claims, No Drawings

METHOD OF ENHANCING OR MAINTAINING A RELATIONSHIP

This invention relates to a method of enhancing or maintaining a relationship between two persons.

The invention has particular application to a man and woman in a marriage relationship but it could be used in other relationships between two persons, such as parent and child.

It is well known that marriage relationships break down and there has been a steady increase in the number of marriage relationship breakdowns over recent years including divorces. There are many theories for the high rate of relationship breakdown, but some analysts believe that many breakdowns are the result of failure by the persons involved in the relationship to communicate effectively with each other. Moreover, it seems that if communication between the persons is not maintained at a certain threshold level, the relationship will almost inevitably break down. Some literature explains the importance of communication in maintaining a relationship while various marriage and relationship counsellors are aware of the importance of communication and teach persons in a relationship to communicate with each other. However, persons in a relationship typically only seek help from a counsellor once the relationship has broken down or at least has begun to break down and then individual counselling is required.

Attempts have been made to assist communication through the use of cards with specific messages and there is the age old practice of one person in a relationship giving cards to the other person, for example, birthday cards, get well cards etc. However, such systems have not been as successful as desired.

The present invention is aimed at providing a method of enhancing or maintaining a relationship between two persons, particularly two persons in a marriage or similar relationship, which can be used to develop a habit of communication thereby decreasing the likelihood of relationship breakdown.

With the foregoing in view, this invention in one aspect resides broadly in a method of enhancing or maintaining a relationship between two persons, including:

- providing a container;
- placing said container in a predetermined location in the dwelling of the persons in the relationship to be enhanced;
- providing a means of communication between the persons, said means of communication being storable in said container;
- providing a set of instructions for use with said means of communication and said container, said set including instructions that each of the persons in the relationship is to create messages to the other person and place them in said container at one or more first predetermined times, and that any messages in said container are to be reviewed at one or more second predetermined times.

Preferably, said one or more first and second predetermined times are the dates of important events involving both persons, for example, the anniversary of their first meeting, their marriage engagement, their wedding, the birthday of their first child or every child, or any other important event. It is also preferred that the messages be reviewed by both persons together at said one or more second predetermined times thus providing a catalyst for discussion. It will be appreciated that the method provides for the storage and exchange of both intimate and non-intimate messages and if the instructions are followed a threshold level of communication is maintained throughout the life of the relationship. It will also be appreciated that the method captures and enhances the unique relational characteristics of the relationship and provides for dynamic communication. Additionally, it will be appreciated that the invention is aimed at enhancing the relationship or at least helping to maintain the relationship between the two persons, and facilitates positive communication between the persons on the basis of a pre-arranged threshold basis. It is believed that if positive communication takes place on the pre-arranged threshold basis then further positive communication will follow thus enhancing the relationship. Reviewing recent messages together and also past messages is believed to facilitate joint reminiscing about past good times and provide a seed for future good times within the relationship. In a case of a serious fight or disagreement between the persons which results in a breakdown in communication, one person may suggest that they review messages in the container.

Preferably, said set of instructions also includes an instruction that one person is to open the container if the relationship is waning or if that person feels insecure and review earlier messages. That person may also leave a new message and preferably, there is also provided indicating means connected to said container for indicating to the other person that a new message has been placed in the container. For example, the indicating means may be a ribbon which is normally in the container but is left exposed by the person adding a new message and the person reading the message could replace the ribbon in the container to indicate that the new message has been read or the container may have a device or symbol positioned thereon to indicate a new message. In one embodiment, the container has a heart on one face and the person leaving the message places the container so that the heart is facing upwards.

Preferably, the method includes obtaining a single container early in the relationship, for example on the day of marriage engagement or the wedding day, and it is believed that if the single container is presented as a gift to both persons by a close friend or relative, say the parents of one of the persons, then the method is more powerful. Moreover, if the single container is used in an important event involving both persons early in the relationship, it is believed that the method will be more powerful and the single container will be seen as a unifying piece of giftware. In one preferred use of the method, the single container is used to hold the wedding rings on the persons' wedding day, and it is believed that the single container will become a symbol of the bond between the persons at that time, and provided that the predetermined location in the dwelling is prominent to both persons, the single container will remind them of that bond and thus help maintain the relationship. Furthermore, in such use it is also preferred that the marriage vows be reduced to writing and the writing be placed in the single container. Preferably, parchment paper or the like is used so that the writing will last for at least the lifetime of the persons involved. It is also preferred that the single container be provided with a supply of blank parchment paper or similar therein together with writing instruments so that messages can be written spontaneously, and it is also preferred that whatever writing instrument is provided, it use permanent ink so that it also lasts for at least the lifetime of the persons involved.

Preferably, said container is constructed of gold, silver or other precious metal, or valuable wood, or adorned with precious jewels, because it is believed that if the container is inherently valuable it will subconsciously promote the idea that the relationship is also valuable and thus the method will also be more powerful. It is also preferred that the container be in the shape of a capsule similar to drug capsules but much larger in order to symbolise a time capsule, thereby subconsciously reminding the persons that the relationship should last forever. However, other shaped containers may be used although it is believed to lesser effect, for example, a container in the shape of a diary in which pen and paper may be kept.

In another aspect the invention resides broadly in a set of instructions for carrying out the method previously described.

In another aspect the invention resides broadly in the combination of a container and a set of instructions for carrying out the method previously described.

In another aspect the invention resides broadly in the combination of a container for use with the method previously described and a piece of jewellery having substantially the same shape and appearance as the container, the piece of jewellery being adapted to be worn by one or both of the persons in the relationship to be enhanced.

In another aspect the invention resides broadly in the combination of a container for use with the method previously described and a piece of jewellery having substantially the same shape and appearance as an emblem on the container, the piece of jewellery being adapted to be worn by one or both of the persons in the relationship to be enhanced.

It will be appreciated that the piece of jewellery will act as a reminder to each person of the container or the emblem and the relationship with the other person thus further enhancing the relationship. In a preferred form, the piece of jewellery is in the form of a locket and miniaturised copies of the marriage vows are contained therein.

A particular advantage of the method is that it provides a hub around which persons in a relationship may be trained in the use of positive communication so that it becomes a natural part of their lives from the very early stages of the relationship.

The foregoing description has been given by way of illustrative example of the invention and all modifications thereto as would be apparent to persons skilled in the art are deemed to fall within the broad scope and ambit of this invention as defined in the appended claims.

The claims defining the invention are as follows:

1. A method of enhancing or maintaining a relationship between two persons residing in a dwelling, including:

providing a single container representing the unity of the two persons in the relationship;

placing said container in a predetermined location in the dwelling of the persons;

providing communication means for facilitating communication between the persons, said communication means being storable in said container; and providing a set of instructions for use with said communication means and said container, said set of instructions including instructions that each of the persons is to create messages to the other person and place them in said container at one or more first predetermined times, and that any messages in said container are to be reviewed at one or more second predetermined times, said one or more first and second predetermined times being the dates of important events involving both persons.

2. A method according to claim 1, wherein said set of instructions includes an instruction that one person may open said container if that person wishes, and review earlier messages.

3. A method according to claim 2, wherein said set of instructions includes an instruction that said one person may also leave a new message.

4. A method according to claim 3, wherein there is also provided indicating means connected to said container for indicating to the other person that said one person has placed a new message in the container, and said set of instructions includes an instruction that said one person is to activate said indicating means to indicate that a new message has been placed in said container.

5. A method according to claim 4, wherein said indicating means is a ribbon which is normally in said container but is left exposed by the person leaving the message.

6. A method according to claim 1, wherein said container is constructed of gold or silver and is adorned with precious jewels.

* * * * *